United States Patent
Legris

(10) Patent No.: US 10,382,961 B2
(45) Date of Patent: Aug. 13, 2019

(54) SYSTEM AND METHOD OF PREVENTING UNAUTHORIZED SIM CARD USAGE

(71) Applicant: Honeywell International Inc., Morristown, NJ (US)

(72) Inventor: Laurent Legris, Mougins (FR)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 14/561,890

(22) Filed: Dec. 5, 2014

(65) Prior Publication Data
US 2016/0165451 A1    Jun. 9, 2016

(51) Int. Cl.
| | |
|---|---|
| *H04W 12/06* | (2009.01) |
| *H04W 12/08* | (2009.01) |
| *H04W 48/02* | (2009.01) |
| *H04B 1/3816* | (2015.01) |
| *H04W 12/12* | (2009.01) |

(52) U.S. Cl.
CPC ......... *H04W 12/08* (2013.01); *H04B 1/3816* (2013.01); *H04W 12/06* (2013.01); *H04W 12/12* (2013.01); *H04W 48/02* (2013.01)

(58) Field of Classification Search
CPC ............................. G06F 21/33; G06F 21/6245
USPC ....... 455/418, 410, 558, 411, 41.1, 1, 404.2, 455/466, 406; 370/352; 340/5.84; 705/15, 64, 39; 711/1; 726/17, 6, 7
See application file for complete search history.

(56) References Cited

U.S. PATENT DOCUMENTS

| | | | |
|---|---|---|---|
| 8,554,912 B1 * | 10/2013 | Reeves ................. | G06F 21/552 455/410 |
| 2002/0049881 A1 * | 4/2002 | Sugimura ............... | G06F 21/31 711/1 |
| 2004/0092248 A1 | 5/2004 | Kelkar et al. | |
| 2005/0071282 A1 * | 3/2005 | Lu ........................... | G06F 21/42 705/64 |
| 2007/0106565 A1 * | 5/2007 | Coelho .................. | G06Q 30/02 705/15 |

(Continued)

OTHER PUBLICATIONS

Extended European search report from corresponding EP patent application 15196907.8, dated Aug. 4, 2016.

(Continued)

*Primary Examiner* — Kiet M Doan
(74) *Attorney, Agent, or Firm* — Husch Blackwell LLP

(57) ABSTRACT

For security purposes, a limited profile SIM, card which preferably does not permit voice communications is provided. For example, the card might support only SMS-type communications. During installation, when the SIM card is initially inserted, or installed in a respective product, a smart phone, table or laptop computer for example, the SIM card pairs with, or becomes bonded to, the product. That card cannot be used subsequently with any other gsm-type module. Responsive to the evaluation at the server, the server transmits a request to operator services for a selected network, for example a GSM 3G or 4G cellular-type communications network. This request can include information as to the SIM card, product and end user for the network along with a request that the profile of the SIM card be modified to include any and all services to be provided, such as voice and/or data. The end user information can be stored in a communications system data base.

13 Claims, 2 Drawing Sheets

(56) References Cited

U.S. PATENT DOCUMENTS

| | | | |
|---|---|---|---|
| 2008/0076459 A1* | 3/2008 | Shaju | H04M 1/72555 |
| | | | 455/466 |
| 2008/0295159 A1* | 11/2008 | Sentinelli | G06F 21/34 |
| | | | 726/6 |
| 2011/0078025 A1* | 3/2011 | Shrivastav | G06Q 20/02 |
| | | | 705/14.64 |
| 2011/0298585 A1* | 12/2011 | Barry | G06F 21/32 |
| | | | 340/5.84 |
| 2012/0009979 A1 | 1/2012 | Thill et al. | |
| 2014/0011478 A1* | 1/2014 | Collins et al. | H04W 12/08 |
| | | | 455/411 |
| 2014/0057597 A1* | 2/2014 | Velusamy | H04W 12/08 |
| | | | 455/411 |
| 2014/0057600 A1* | 2/2014 | Dung | H04W 8/02 |
| | | | 455/411 |
| 2014/0171024 A1* | 6/2014 | Huang | H04W 4/12 |
| | | | 455/411 |

OTHER PUBLICATIONS

Partial European search report from corresponding EP patent application 15196907.8, dated May 6, 2016.
3rd Generation Partnership Project; Technical Specification Group Services and System Aspects; Feasibility study on the security aspects of remote provisioning and change of subscription for Machine to Machine (M2M) equipment (Release 9), 3GPP TR 33.812 V9.2.0, technical report, dated Jun. 22, 2010.
At&t Emerging Devices, Embedding Global Connectivity, Best Practices and Deployment Considerations, White Paper revision v8, pp. 1-19, dated Jun. 28, 2013.

* cited by examiner

SYSTEM AND METHOD OF PREVENTING UNAUTHORIZED SIM CARD USAGE

FIELD

The application pertains to systems and methods of limiting SIM card usage. More particularly, functionality is provided to pair a SIM card with a product, making the card unusable with a different product to minimize unauthorized usage.

BACKGROUND

Machine-to-machine (M2M) solutions and systems are known and effective to provide communications, voice and data, between various devices. For example, smart phones communicating with an available GMS-type 3G or 4G wireless system to implement communications between the phone and other systems or products. Unauthorized use of SIM cards associated with such systems is an on-going problem.

Most connected objects use M2M SIM cards with data usage and in a few cases voice usage. When a SIM card is not activated, this card cannot be used. The operator does not want to activate this SIM card until the client acknowledges receipt of the card. This is a way to avoid fraudulent usage. But once the client has received this SIM card and asked for activation, the client will have to pay in the case of improper usage. The question becomes, what is the best way to avoid fraudulent usage?

IMEI and SIM card identification information can be used to pair the card with a product. But there is still a gap between the activation and the SIM pairing. As a result, a user can insert an activated card into his/her smartphone to obtain data or voice service. In case of data overuse there is real time threshold which when crossed, informs in case of excessive usage. Voice usage information is not in real time and it can take more than 24 hours especially when roaming.

DETAILED DESCRIPTION

Figure 1:
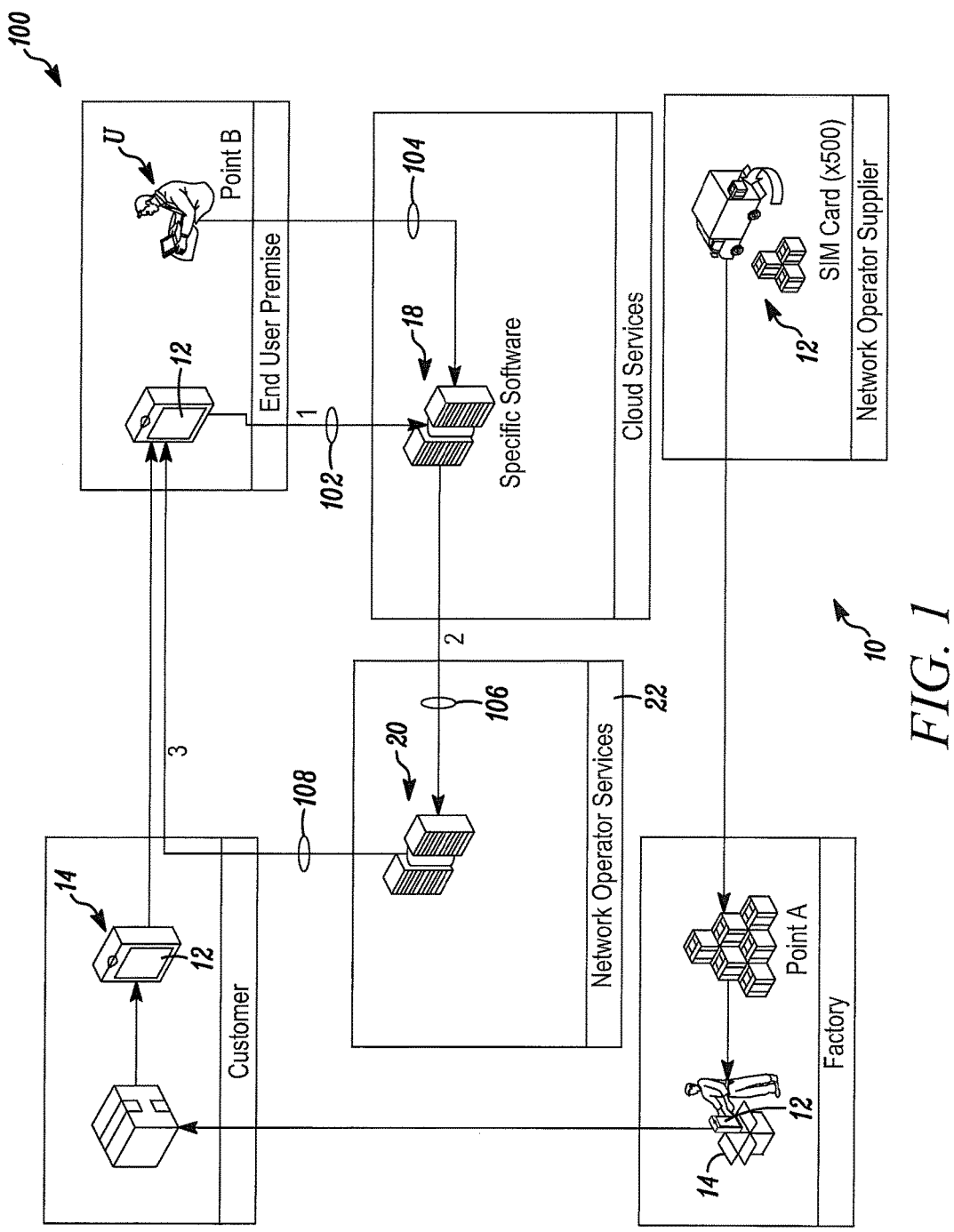
FIG. 1 illustrates aspects of a system and process in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, embodiments hereof can enable the SIM voice usage only when the SIM card has established a connection to a specific server in a data mode. In another aspect, embodiments hereof can automatically disable data usage.

In a disclosed embodiment, specific software is located on a security server with a specific IP address and which implements a specific authentication process. (It will be understood that this authentication process can be used with other M2M devices without limitation. When a SIM card establishes communications, the network operator's servers can inform the specific software on the security server. If there is no authentication process for this SIM card at the security server, a decision can be made without waiting to cross a threshold.) When the SIM card is inserted in a connected object, this object will establish a first data call with this server.

This security server will interact with a network operator's server through a web service to request that voice be enabled. On the other hand, if the SIM card is improperly inserted in a smartphone the network server will have no record of it and can notify the security server. If this SIM card is not known to the security it means it never called the security server. The security server can ask the network server for a termination, or a suspension, or other alternates without limitation.

FIG. 1 illustrates aspects of both a system 10 and method 100 in accordance herewith. Initially, a limited profile, or capability, SIM card 12 (profile limited, for example, to SMS-type service, without voice) is provided by a supplier to be used with a predetermined product 14. It will be understood that the SIM card 12 can be provided separately to an end user U or the SIM card 12 can be shipped with the product 14 as at Point A.

During installation, for example at the end user's premises, Point B, when the SIM card 12 is initially inserted, or installed in a respective product, such as a smart phone, tablet or laptop computer, and the product is energized, the SIM card pairs with, or becomes bonded to, the product 14. It cannot be used with any other GSM module.

Also, during the installation process, in one embodiment, once the SIM card 12 has been installed in the product 14, a first automatic call or transmission is made from the SIM card/product 12/14 combination to a security server 18, as at link 102. This transmission of an SMS-type message from the SIM card/product combination to the server 18 includes, for example, some or all of the serial number of the SIM card, the International Mobile Station Equipment Identity (IMEI) number of the product 14 as well as any other identification information from the device's serial number, without limitation, and, optionally end user identification information.

In an alternate embodiment, portions of the above noted information can be manually entered by user U, and coupled to server 18 via link 104. It will be understood that the system 10 need not require any manual inputs from user U.

The server 18 evaluates the information of the message from the SIM card/product 12/14 combination, and if the information corresponds to an expected combination of SIM card/product 12, 14 the security server 18 sends a request, as at link 106, to a server 20 at network operation services, for example a 3G, or 4G type network 22 to expand the profile, or capabilities, of the SIM card 12 to support voice and/or data transmissions beyond that which is supported by the SMS-type communications.

The response by server 18 to the first automatic call, link 102, translates into the transmission, link 106, from the security server 18 to the network services operator 22. This transmission authorizes the network operator 22 to alter the profile of the SIM card 12 by activating voice and data services, as at link 108. At this time, the combination of SIM card/product 12/14 is fully operational for normal communications.

Figure 2:
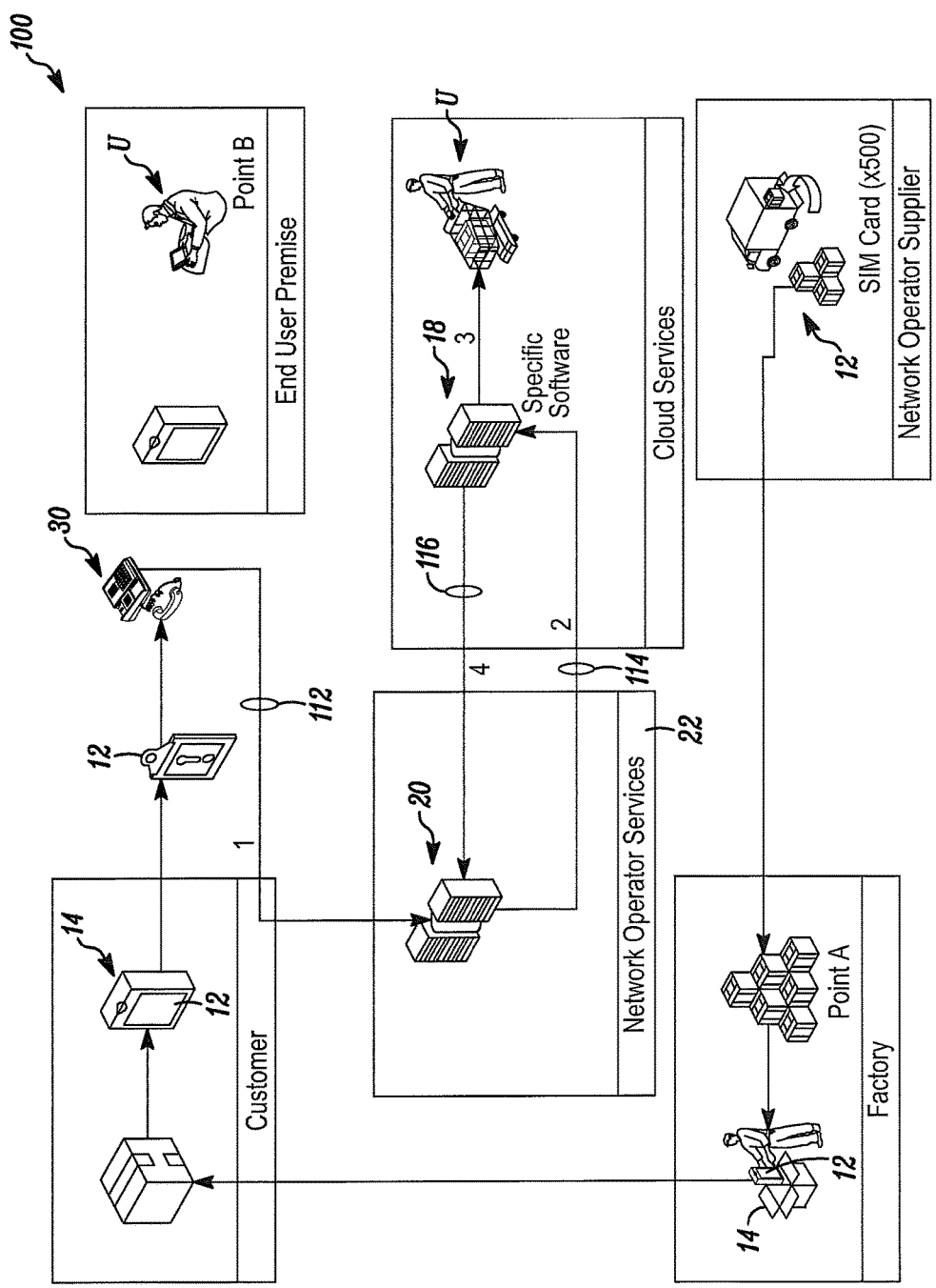
FIG. 2 illustrates other aspects of a system and method as in FIG. 1.

As illustrated in FIG. 2, where an improper attempt is made to use SIM card 12, with a limited profile as described above, with a different product, such as phone 30, the network services operator 22 will detect the limited profile of card 12, via link 112, and notify server 18, via link 114. Server 18 can in turn determine that the card 12 is not associated with an authorized end user, such as user U. As a result, the operator 22, via link 116 can be directed to terminate operation of the card 12, or limit data usage.

In summary, for security purposes, a limited profile SIM card, which preferably does not permit voice communications is provided. For example, the card might support only SMS-type communications.

During installation, when the SIM card is initially inserted, or installed in a respective product, a smart phone, tablet or laptop computer, for example, the SIM card pairs with, or becomes bonded to, the product. That card can not be used subsequently with any other gsm-type module.

In addition, during installation, when the product is first turned on, or energized, the SIM card/product combination automatically transmits a limited message, for example via SMS service, which includes card identifying information, and product identifying information, to a selected security server. The server, via security software, evaluates the received SIM card and product information, along with user information as available.

Responsive to the evaluation at the security server, the server transmits a request to operator services for a selected network, for example a GSM 3G or 4G cellular-type communications network. This request can include information as to the SIM card, product and end user for the network along with a request that the profile, or capabilities, of the SIM card 12 be modified to include any and all services to be provided, such as voice and/or data. The end user information can be stored in a communications system data base.

The communications system can in turn download information to and modify the profile of the subject SIM card in the product. The modified profile works with the product to provide all services as needed.

Because the SIM card is now bonded to, or paired with the product, if the SIM card is removed from the authorized product and installed into a different product, this discrepancy will be recognized by the communications network and the SIM card can be disabled.

The first call from the limited capability SIM card after installation, to the selected security server, provides a vehicle to effect broadening the capabilities of the SIM card while precluding use of the SIM card on an unauthorized product.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A process comprising:
    providing a SIM card having an initially restricted profile that excludes and prevents voice communications until the SIM card is authenticated, but allows for communication via a short message-type service;
    installing the SIM card into a first communication device;
    responsive to installing the SIM card into the first communication device, automatically transmitting a SIM card identifier and a first identifier of the first communication device to a security server via the short message-type service;
    responsive to transmitting the SIM card identifier and the first identifier of the first communication device to the security server, receiving an authentication message from the security server that indicates the security server authenticates the SIM card and the first communication device; and
    responsive to the security server authenticating the SIM card and the first communication device, expanding the initially restricted profile of the SIM card to provide for the voice communications,
    further comprising: pairing the SIM card with the first communication device; and precluding use of the SIM card with a different communication device.

2. The process as in claim 1 further comprising:
    pairing the SIM card with the first communication device; and
    automatically communicating with the security server,
    wherein expanding the initially restricted profile of the SIM card to provide for the voice communications comprises requesting, via the authentication message received from the security server, that the initially restricted profile of the SIM card be broadened to provide expanded services in conjunction with use with the first communication device.

3. The process as in claim 2 further comprising forwarding the authentication message received from the security server to a network service provider.

4. The process as in claim 3 wherein expanding the initially restricted profile of the SIM card to provide for the voice communications comprises the network service provider modifying the initially restricted profile of the SIM card at the first communication device to provide for the voice communications.

5. The process as in claim 2 further comprising:
    providing a network; and
    expanding the initially restricted profile of the SIM card to enable the use of the SIM card with the first communication device.

6. The process as in claim 1 wherein the short message-type service or a data communication channel facilitates interaction with a cellular data network.

7. The process as in claim 1 wherein expanding the initially restricted profile of the SIM card to provide for the voice communications comprises the security server transmitting the authentication message to a network operator to modify the initially restricted profile of the SIM card to enable the voice communications or to enable data transmission in connection with operation of the first communication device.

8. The process as in claim 1 further comprising using the SIM card identifier and the first identifier of the first communication device in pairing the SIM card with the first communication device.

9. The process as in claim 8 further comprising:
    providing an end user data base; and
    associating the SIM card with an end user in the end user data base.

10. The process of claim 1 wherein the SIM card identifier includes a SIM card serial number.

11. The process of claim 1 wherein the first identifier of the first communication device includes an international mobile station equipment identity (IMEI) number of the first communication device.

12. The process of claim 1 further comprising modifying the initially restricted profile of the SIM card to provide for data transmissions.

13. The process of claim 1 further comprising:
- determining if an attempt is being made to use the SIM card improperly; and
- responsive to determining that improper usage has been detected, generating an alarm signal and terminating operation of the SIM card.

* * * * *